US 9,589,466 B2

(12) United States Patent
Huang (10) Patent No.: US 9,589,466 B2
(45) Date of Patent: Mar. 7, 2017

(54) SYSTEM AND DEVICE FOR PARKING MANAGEMENT

(71) Applicant: International Mobile IOT Corp, Taipei (TW)

(72) Inventor: Jung-Tang Huang, Taipei (TW)

(73) Assignee: INTERNATIONAL MOBILE IOT CORP., Taipei (TW)

( * ) Notice: Subject to any disclaimer, the term of this patent is extended or adjusted under 35 U.S.C. 154(b) by 0 days.

(21) Appl. No.: 14/541,162

(22) Filed: Nov. 14, 2014

(65) Prior Publication Data
US 2015/0130642 A1 May 14, 2015

(30) Foreign Application Priority Data

Nov. 14, 2013 (TW) .............................. 102141476 A (51) Int. Cl.
*B60Q 1/48* (2006.01)
*G08G 1/14* (2006.01)
*B62D 15/02* (2006.01)
(52) U.S. Cl.
CPC ............ *G08G 1/143* (2013.01); *B62D 15/028* (2013.01); *G08G 1/144* (2013.01); *G08G 1/147* (2013.01); *B60T 2201/10* (2013.01)
(58) Field of Classification Search
CPC .......... G08G 1/14; G08G 1/141; G08G 1/143; G08G 1/144; G08G 1/147; B60T 2201/10; B62D 15/028
USPC ......................................... 340/932.2; 705/13
See application file for complete search history.

(56) References Cited

U.S. PATENT DOCUMENTS

| 6,107,942 | A  | * | 8/2000  | Yoo et al. ................. 340/932.2 |
| 6,885,311 | B2 | * | 4/2005  | Howard et al. ............ 340/932.2 |
| 7,312,722 | B2 | * | 12/2007 | Tillotson et al. .......... 340/932.2 |
| 7,834,778 | B2 | * | 11/2010 | Browne et al. ............ 340/932.2 |
| 7,889,099 | B2 | * | 2/2011  | Aubrey .................... G08G 1/14 340/932.2 |
| 8,576,092 | B2 | * | 11/2013 | Levy et al. ................ 340/932.2 |

(Continued)

FOREIGN PATENT DOCUMENTS

CN 1361601 A 7/2002
CN 101276519 A 10/2008
(Continued)

OTHER PUBLICATIONS

Yi-Ping Luo, License Plate Recognition Jan. 27,2004, Internet links: http://www.asmag.com/tw/article/article_detail.aspx?aid=4344.

*Primary Examiner* — John A Tweel, Jr.
(74) *Attorney, Agent, or Firm* — Jianq Chyun IP Office (57) ABSTRACT

The present disclosure provides a system for parking management comprises at least one locating device configured to broadcast a location information to an electronic device and to receive a determined location which is broadcasted by the electronic device; and a management server configured to receive the determined location from the at least one locating device, wherein the management server is configured to provide a vacancy information to the electronic device according to the received determined location, wherein the determined location is determined by the electronic device according to the location information broadcasted by the at least one locating device.

20 Claims, 9 Drawing Sheets

(56) References Cited

U.S. PATENT DOCUMENTS

| | | | | |
|---|---|---|---|---|
| 8,624,756 | B2* | 1/2014 | Ganot | G07B 15/02 340/932.2 |
| 8,723,689 | B2* | 5/2014 | Mimeault | G08G 1/14 340/932.2 |
| 8,816,880 | B1* | 8/2014 | Foster | 340/932.2 |
| 2010/0060485 | A1* | 3/2010 | Kim | 340/932.2 |
| 2011/0015934 | A1* | 1/2011 | Rowe et al. | 340/932.2 |
| 2011/0133957 | A1* | 6/2011 | Harbach | G08G 1/14 340/932.2 |
| 2012/0056758 | A1* | 3/2012 | Kuhlman | G08G 1/14 340/932.2 |
| 2012/0098677 | A1* | 4/2012 | Geelen | 340/932.2 |
| 2012/0299749 | A1* | 11/2012 | Xiao et al. | 340/932.2 |
| 2013/0103200 | A1 | 4/2013 | Tucker et al. | |

FOREIGN PATENT DOCUMENTS

| | | |
|---|---|---|
| CN | 101303800 A | 11/2008 |
| CN | 102117549 A | 7/2011 |
| CN | 102226933 A | 10/2011 |
| CN | 102289950 A | 12/2011 |
| CN | 102722999 A | 10/2012 |
| CN | 102831785 A | 12/2012 |
| CN | 202677543 U | 1/2013 |
| CN | 103247179 A | 8/2013 |
| TW | M439135 U | 10/2012 |
| TW | 201303805 A | 1/2013 |
| TW | I381336 B1 | 1/2013 |

* cited by examiner

SYSTEM AND DEVICE FOR PARKING MANAGEMENT

FIELD OF THE INVENTION

The present invention relates generally to a locating system and method. More specifically, the present invention relates to a locating system and method for parking management in indoor or outdoor environment.

BACKGROUND OF THE INVENTION

As the evolution of network technology, networking between machines and people has become a common solution for management purposes. Various types of interactions between machines and people provide different LBS (location based service), such as parking services.

Parking has been a serious problem in many countries. In terms of parking difficulties, many drivers may waste a lot of time finding a parking space on the road or within a parking structure. Although some of the parking structures may provide numbers of vacancies at the entrance of the parking structure, this does not help in finding the vacant parking spaces. Furthermore, the more time spending on finding a vacant parking space, the more vehicles staying on the road, thus causing traffic problems and more air pollutions. Illegal parking is another reason causing traffic problems. For example, illegally parked vehicle may jam the traffic, especially while emergent event occurs such as ambulance or fire truck on duty. Although illegal parking may be reported through manual patrol, illegal parking cannot be eliminated immediately via manual patrol. In other words, parking without management causes traffic and environment problems.

According to the above, what is needed is a management system for parking service that conveniently solves parking problems and reduce illegal parking problems.

BRIEF SUMMARY OF THE INVENTION

In view of the foregoing subject, a general objective of the present invention is to provide a locating device or a system including at least one locating device to provide LBS. More specifically, a more specific objective of the present invention is to provide a locating system for the application of parking management.

The invention provides a system for parking management which comprises at least one locating device configured to broadcast a location information to an electronic device and to receive a determined location which is broadcasted by the electronic device; and a management server configured to receive the determined location from the at least one locating device, wherein the management server is configured to provide a vacancy information to the electronic device according to the received determined location, wherein the determined location is determined by the electronic device according to the location information broadcasted by the at least one locating device. The system for parking management allows any user or vehicle with the electronic device to obtain the vacancy information of a parking area.

The invention also provides a method for parking management which comprises the following steps: receiving, by a management server, a determined location from an electronic device via a locating device; and sending, by the management server, a map marked with the determined location, vacancy information and navigation route to the electronic device. The method for parking management allows the management server to assist any user or vehicle with parking area, thus the user or vehicle would not waste time in finding a parking space.

The invention also provides a locating device for parking management which comprises a directional antenna coupled to the wireless transceiver; and a wireless transceiver configured to use the directional antenna to broadcast a location information to an electronic device and to use the directional antenna to receive a determined location which is broadcasted by the electronic device, wherein the electronic device determines the determined location according to the location information. The locating device allows any vehicle or user with the electronic device to know their own location in a parking area with the locating device.

The invention also provides a method for vehicle parking comprises the following steps: receiving, by an electronic device, a location information broadcasted by a locating device; and determining, by the electronic device, a determined location; and sending, by the electronic device, the determined location to a management server; and requesting, by the electronic device, a vacancy information from the management server; and receiving, by the electronic device, a vacancy information according to the determined location from the management server. The method for vehicle parking assists any user or vehicle with the electronic device with parking.

In view of the above, the invention disclosed above can reduce the time wasted on the way finding a parking space.

It should be understood, however, that this summary may not contain all aspects and embodiments of the present invention, that this summary is not meant to be limiting or restrictive in any manner, and that the invention as disclosed herein will be understood by one of ordinary skill in the art to encompass obvious improvements and modifications thereto.

BRIEF DESCRIPTION OF THE DRAWINGS

The accompanying drawings illustrate one or more embodiments of the invention and together with the written description, serve to explain the principles of the invention. Wherever possible, the same reference numbers are used throughout the drawings to refer to the same or like elements of an embodiment, and wherein.

In accordance with common practice, the various described features are not drawn to scale and are drawn to emphasize features relevant to the present disclosure. Like reference characters denote like elements throughout the figures and text.

DETAILED DESCRIPTION OF THE INVENTION

The present invention will now be described more fully hereinafter with reference to the accompanying drawings, in which exemplary embodiments of the invention are shown. This invention may, however, be embodied in many different forms and should not be construed as limited to the embodiments set forth herein. Rather, these embodiments are provided so that this disclosure will be thorough and complete, and will fully convey the scope of the invention to those skilled in the art. Like reference numerals refer to like elements throughout.

The terminology used herein is for the purpose of describing particular embodiments only and is not intended to be limiting of the invention. As used herein, the singular forms "a", "an" and "the" are intended to include the plural forms as well, unless the context clearly indicates otherwise. It will be further understood that the terms "comprises" and/or "comprising," or "includes" and/or "including" or "has" and/or "having" when used herein, specify the presence of stated features, regions, integers, steps, operations, elements, and/or components, but do not preclude the presence or addition of one or more other features, regions, integers, steps, operations, elements, components, and/or groups thereof.

It will be understood that the term "and/or" includes any and all combinations of one or more of the associated listed items. It will also be understood that, although the terms first, second, third etc. may be used herein to describe various elements, components, regions, parts and/or sections, these elements, components, regions, parts and/or sections should not be limited by these terms. These terms are only used to distinguish one element, component, region, part or section from another element, component, region, layer or section. Thus, a first element, component, region, part or section discussed below could be termed a second element, component, region, layer or section without departing from the teachings of the present invention.

Unless otherwise defined, all terms (including technical and scientific terms) used herein have the same meaning as commonly understood by one of ordinary skill in the art to which this invention belongs. It will be further understood that terms, such as those defined in commonly used dictionaries, should be interpreted as having a meaning that is consistent with their meaning in the context of the relevant art and the present disclosure, and will not be interpreted in an idealized or overly formal sense unless expressly so defined herein.

The description will be made as to the embodiments of the present invention in conjunction with the accompanying drawings in FIGS. 1 to 9. Reference will be made to the drawing figures to describe the present invention in detail, wherein depicted elements are not necessarily shown to scale and wherein like or similar elements are designated by same or similar reference numeral through the several views and same or similar terminology.

Figure 1:
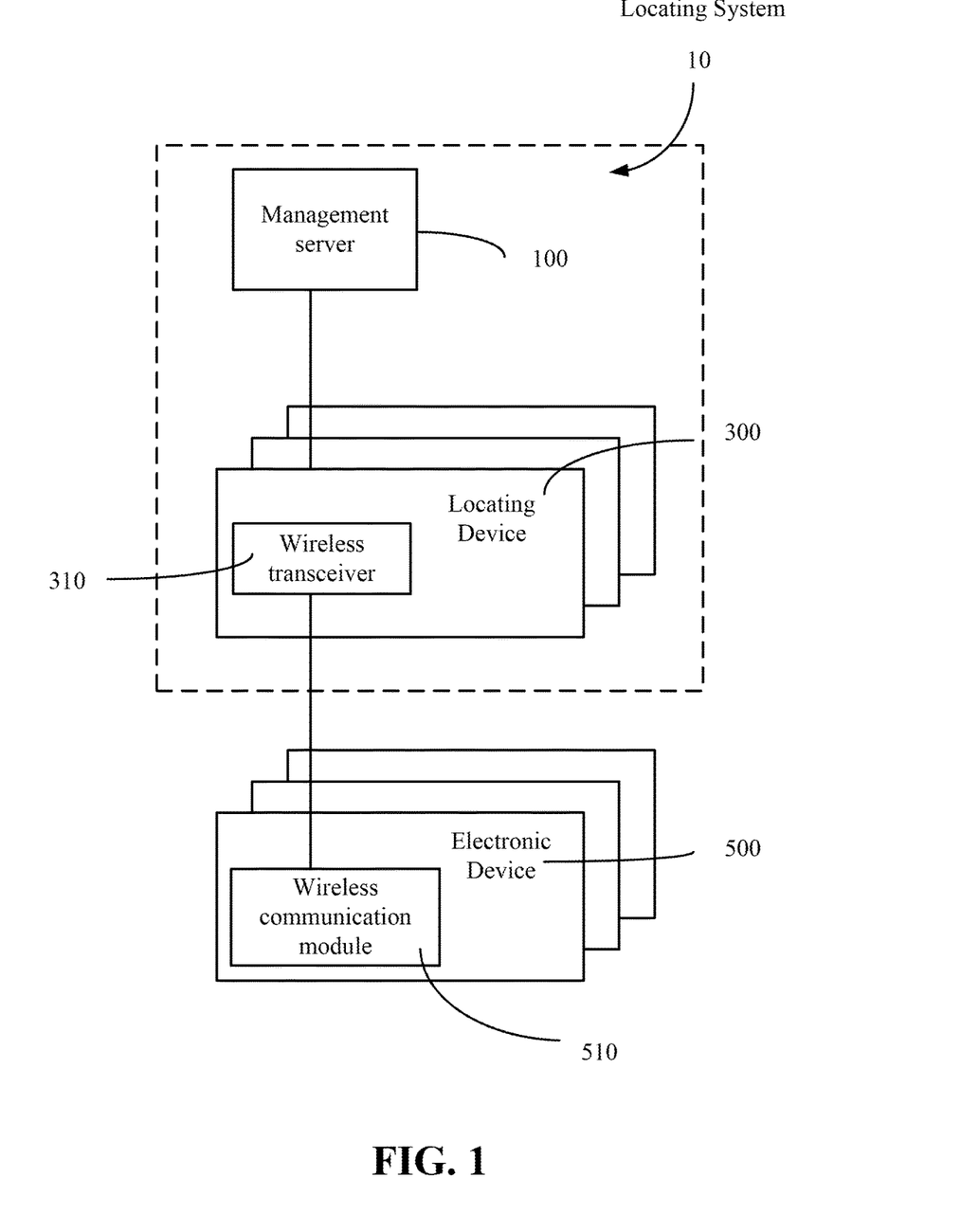
FIG. 1 is a schematic illustration of the locating system according to one embodiment of the present invention.

FIG. 1 schematically shows a locating system 10 which may comprise a management server 100 and at least one locating device 300 with a wireless transceiver 310 according to one embodiment of the present invention, wherein the management server 100 and the locating device 300 may interact with at least one electronic device 500 with a wireless communication module 510.

Referring to FIG. 1, the locating device 300 may have a location information and broadcast the location information via the wireless transceiver 310 to any electronic device 500 within the range. The electronic device 500 may receive the location information of the locating device 300 via the wireless communication module 510 when the electronic device 500 is in the broadcasting range of the locating device 300, and the electronic device 500 may determine a location of the electronic device 500 according to the received location information and the RSSI of the broadcasting. The determined location of the electronic device 500 may be broadcasted by the wireless communication module 510 of the electronic device 500 with an identification information of the electronic device 500 to at least one locating device 300 within the broadcasting range of the electronic device 500. The at least one locating device 300 which may receive the determined location and the identification information of the electronic device 500 may send the determined location and the identification information to the management server 100. The management server 100 may be configured to send a management information to the electronic device 500 according to the received determined location and the identification information.

In one embodiment of the present invention, the electronic device 500 may be a mobile or non-mobile computing device such as a mobile phone, a tablet PC, a navigation device, an OBU (on-board unit) of a vehicle, a vehicle console, etc.

In one embodiment of the present invention, in case of a user within a parking area carrying the electronic device 500 which is a mobile computing device, the user may locate the parked vehicle by accessing the management server 100 via internet, wherein the user may obtain the vehicle last location with a reference of the identification information.

In one embodiment of the present invention, the identification information may be a device ID, a user ID, a vehicle plate number, etc.

In one embodiment of the present invention, the management server 100 may be connected to the locating device 300 via any form of wireless connection such as Wi-fi, Bluetooth, etc.

In one embodiment of the present invention, the management server 100 may be connected to the locating device 300 via any form of wired connection such as PLC, Ethernet, etc.

In one embodiment of the present invention, the locating device 300 may be a device in local infrastructure such as a street light, a light on ceiling, a light on the wall, a light on the ground, a gate, etc.

In one embodiment of the present invention, the location information may comprise coordinate, such as longitude, latitude, altitude, cylindrical coordinate or any other forms of three dimensional coordinate systems, wherein the coordinate may be a definite coordinate which is applicable in real world or a relative coordinate which is only applicable in a specific area where the at least one locating device 300 may be installed.

In one embodiment of the present invention, the location information may comprise floor number, parking section number, parking space number, or any other forms of information which may specify a definite or relative location.

In one embodiment of the present invention, the management information may be a parking information, such as map of the parking area with an indication of the location of the electronic device 500, a vacancy information such as location of vacant parking spaces around the parking area, navigation route to the nearest vacant space relative to the electronic device 500, parking fee rate, etc.

In one embodiment of the present invention, the determination of location by the electronic device 500 may be realized by triangulation positioning, or any other telecommunication positioning method.

In one embodiment of the present invention, the locating system 10 may be operated in-door and/or out-door.

In one embodiment of the present invention, the vacancy information may be provided to the electronic device 500 by the management server 100 according to the determined location as the management server may be configured to provide the nearest vacant parking spaces to the determined location as vacancy information. Furthermore, the management server 100 may send the vacancy information to the electronic device 500 via the nearest locating device 300 according to the determined location when a direct transmission between management server 100 and the electronic device 500 is not available.

Figure 2:
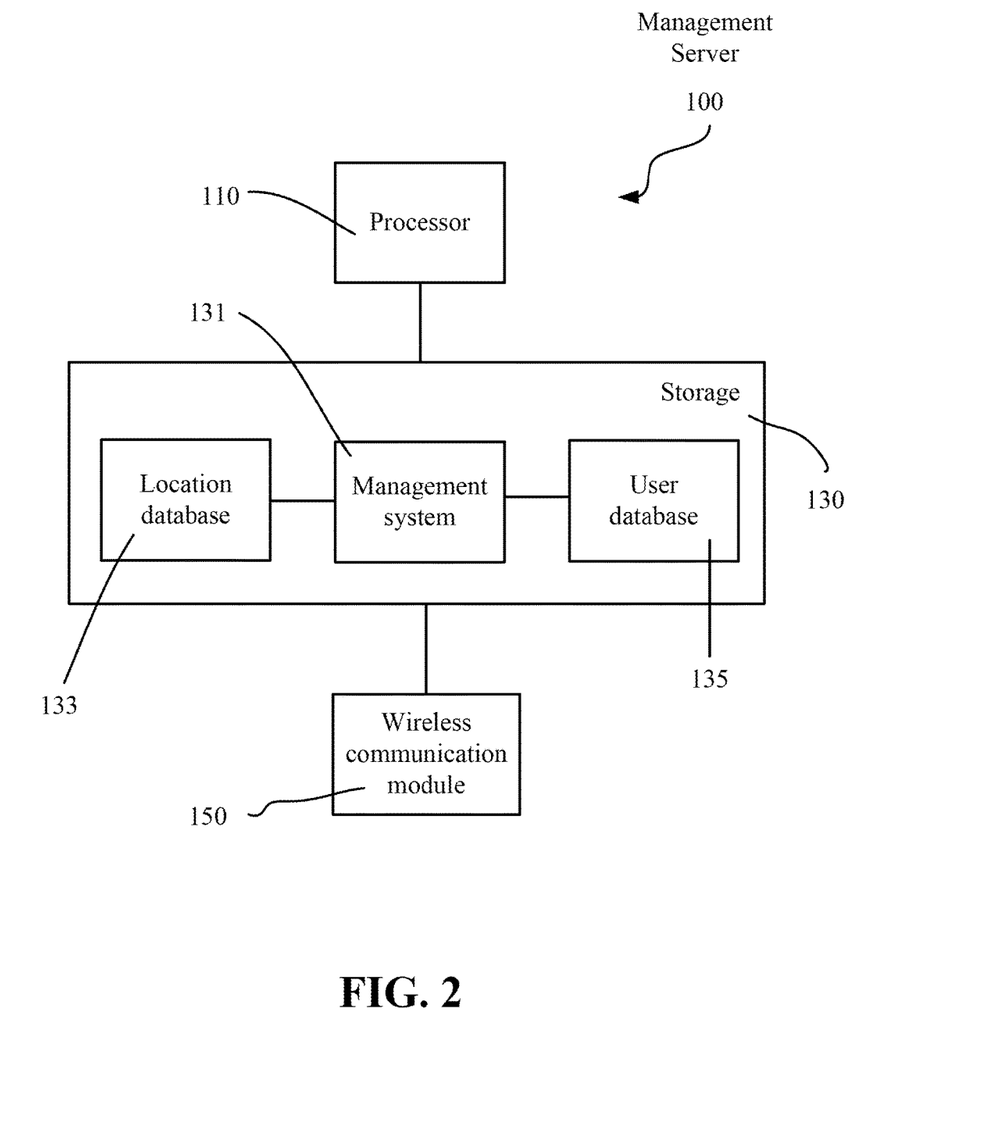
FIG. 2 is a schematic illustration of the management server according to one embodiment of the present invention.

FIG. 2 schematically shows that the management server 100 of the locating system 10 may comprise a processor 110, a storage 130 and a wireless communication module 150 according to one embodiment of the present invention, wherein the processor 110 may operate the management system 131. The storage 130 may comprise a management system 131, a location database 133 and a user database 135.

Referring to FIG. 2, the management server 100 may receive a location information and an identification information from an electronic device 500 and store them in the storage 130, wherein the received location information may be stored in the location database 133, and the identification information may be stored in the user database 135. A management information may be determined by the management system 131 and the processor 110 according to the location information and the identification information, and the management information may be sent to the electronic device 500 from the management system 131.

In one embodiment of the present invention, the location database 133 may comprise a map and the location information may be a coordinate, wherein the management system 131 may mark the location of electronic device 500 on the map according to the coordinate, and the marked map may be sent to the electronic device 500 as the management information.

In one embodiment of the present invention, the map in location database 133 may be a $3^{rd}$ party map, a Google map, a GIS map, a map of a specific area wherein the locating device may be installed, etc.

In one embodiment of the present invention, the location database may further comprise location information of local infrastructure together with the map, wherein the location information of local infrastructure may be parking spaces information such as coordinates of parking spaces, parking rate, location of the entrances, location of exits, etc.

In one embodiment of the present invention, the identification information may be a device ID, a user ID or a vehicle plate number.

In one embodiment of the present invention, the user database 135 may further comprise information associated with the stored identification information, for example time of entrance, time of exit, vehicle type, vehicle color, etc.

In one embodiment of the present invention, the transmission of the location information and the identification information between the management server 100 and the electronic device 500 may be a direct transmission or an indirect transmission. The direct transmission may be a wireless transmission, wherein the management server 100 may further comprise a wireless communication module 150. The indirect transmission may be via at least one locating device 300 in between. For example, the electronic device 500 may wirelessly send the location information and the identification information to the at least one locating device 300, and the at least one locating device 300 may pass the location information and the identification information to the management server 100 using wireless or wired transmission. Also, opposite direction of transmission via the at least one locating device 300 is applicable.

Figure 3:
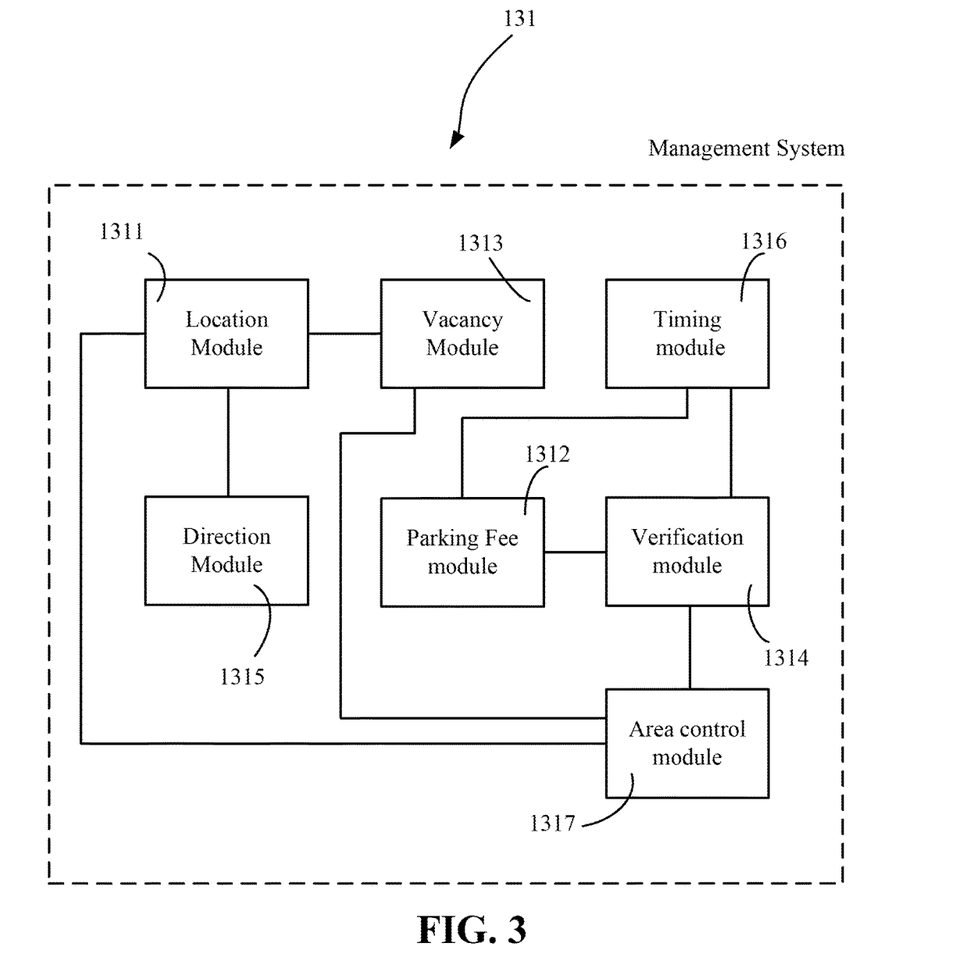
FIG. 3 is a schematic illustration of the management system according to one embodiment of the present invention.

FIG. 3 schematically illustrates the management system 131 of the management server 100 comprising a location module 1311, a vacancy module 1313, a direction module 1315, an area control module 1317, a parking fee module 1312, a verification module 1314 and a timing module 1316 according to one embodiment of the present invention. The location module 1311 may be coupled to the vacancy module 1313 and the direction module 1315. The parking fee module 1312, the verification module 1314 and the timing module 1316 may be coupled to one another. The area control module 1317 may be coupled to the location module 1311, the vacancy module 1313 and the verification module 1314.

Referring to FIG. 3, in one embodiment of the present invention the management system 131 may be coupled to a location database 133, wherein the management system 131 may obtain a map from the location database 133. The management system 131 may receive a location information from an electronic device 500, and mark the location of electronic device 500 on the map obtained from the location database 133. The vacancy module 1313 may use the location database 133 to determine the coordinates of vacant parking spaces and provide the coordinates to the location module 1311. The location module 1311 may mark the coordinates of vacant parking spaces together with the location information of the electronic device 500 on the map obtained from the location database 133. The direction module 1315 may determine at least one navigation route on the map from the location of electronic device 500 to one of the vacant parking space according to the map if there is any vacant parking space available.

In one embodiment of the present invention, the navigation route may be determined based on the distance or travel time between the vacant parking spaces and the electronic device 500.

In one embodiment of the present invention, the verification module 1314 may verify an identity information of a user/vehicle of the electronic device 500 by using a user database 135, wherein the identity information may be a device ID, user ID, vehicle plate number, etc. As the electronic device 500 is verified, the area control module 1317 may produce a management instruction such as the permit of entrance and/or exit of the device user. The timing module 1316 may determine a parking time associated with the identification information, and the parking fee module 1312 may calculate a parking fee of a vehicle with the identification information using a parking rate obtained from the location database 133.

In one embodiment of the present invention, the vacancy of parking spaces may be determined by the management server 100 by comparison between the location information of parking spaces and location information of vehicles, wherein the location information of vehicles may be the determined location saved in the management server 100 from the electronic device 500. The determined location saved in the management server 100 may be refreshed repeatedly as at least one electronic device 500 send the determined location via at least one locating device 300 to the management server 100. The location information of parking spaces may be pre-configured and stored in the location database 133, or the location information of parking spaces may be obtained by providing a locating device 300 at every parking spaces, so the location information of parking spaces may be the same as the location information of the locating devices. In view of the above, the vacancy information may be determined as parking space occupied as the location information of parking space is the same as location information of the vehicle. Otherwise, the vacancy information may be determined as parking space available as the location information of parking space is different from that of the vehicle.

In another embodiment of the present invention, the vacancy of parking spaces may be determined by providing a locating device 300 above a parking space and a ground embedded device (not shown) with a wireless module, wherein the ground embedded device may repeatedly send a signal to the locating device 300. When the parking space is occupied by a vehicle, the signal may be blocked by the vehicle and therefore the locating device 300 may notify the management server 100 with a occupancy notification that the parking space is occupied, and thus the vacancy information may be produced by the management server 100. Otherwise, when the locating device 300 keeps receiving the signal, the management server 100 may determine the vacancy information as the parking space is available. The ground embedded device may be a ground light wherein the management server 100 may send a management instruction to the ground embedded device to change the illumination level or color. In view of the above, the vacancy information is determined based on receiving status of the signal.

In one embodiment of the present invention, the area control module 1317 may send management instruction to any local infrastructure connected to the locating system 10 such as lighting, gate, etc. Thus, the local infrastructure connected to the locating system 10 may be controlled (e.g. illumination of light, entrance gate of parking, exit gate of parking).

Figure 4:
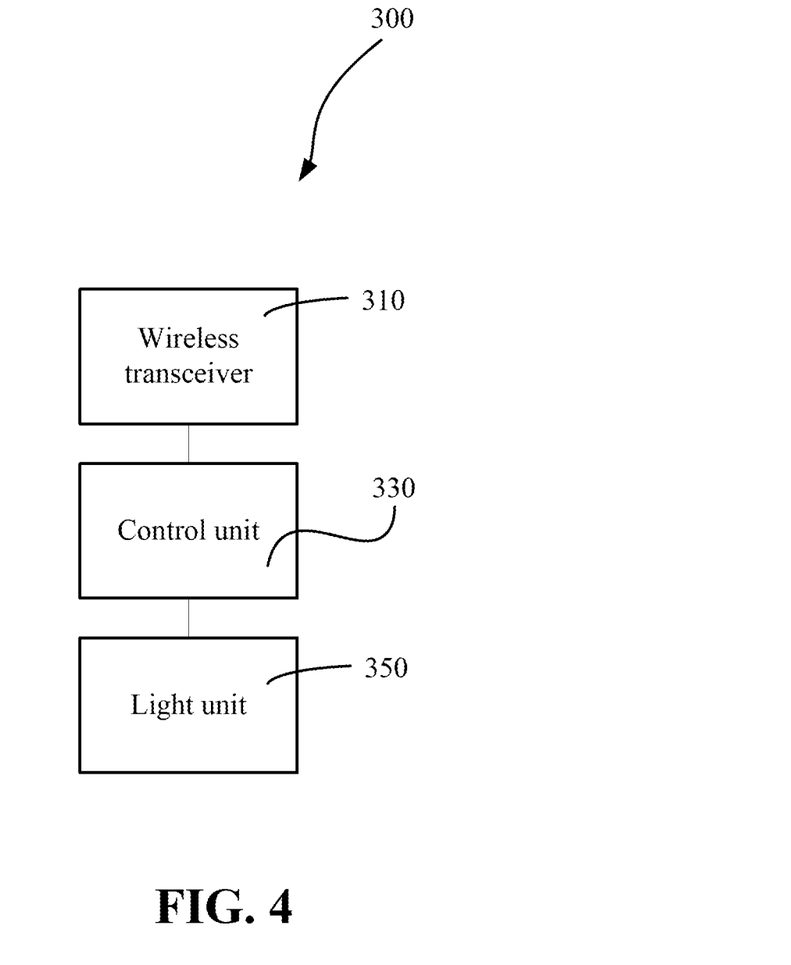
FIG. 4 is a schematic illustration of the locating device according to one embodiment of the present invention.

FIG. 4 schematically illustrates the locating device 300 comprising a wireless transceiver 310, a control unit 330 and a light unit 350 according to one embodiment of the present invention. The control unit 330 may control the illumination of the light unit 350, for example brightness and/or color. As all parking area may need lighting for safety consideration, in one embodiment of the present invention, the locating device 300 may be an illumination source of a parking area and be electrically connected to the grid or any other AC power source, thus lighting is provided by the locating device 300 which is adapted to change brightness and/or color for safety or eye comfort consideration. Furthermore, most of the lighting is provided higher than vehicle and human, therefore having the locating device 300 as illumination source may provide clear line of sight between the locating device 300 and the electronic device 500 for less transmission interference.

Referring to FIG. 4, in one embodiment of the present invention, the control unit 330 may turn on the light unit 350 once the locating device 300 receives a determined location from an electronic device 500.

In another embodiment of the present invention, the control unit 330 may control the light unit 350 according to a management instruction sent from an area control module 1317 of a management server 100. The management instruction may be changing illumination brightness and/or color.

In one embodiment of the present invention, the locating device 300 may further comprise a directional antenna (not shown) coupled to the wireless transceiver 310, wherein the broadcasting range of the wireless transceiver 310 via the directional antenna may be limited to a specific area, thus reducing transmission interference between a plurality of locating devices 300. Furthermore, the locating device 300 may be installed at height higher than human or vehicle, for example on the ceiling. And the directional antenna may be aimed downwards to obtain a clear line of sight between an electronic device 500 and the locating device 300 to reduce transmission interference.

In another embodiment of the present invention, the locating device 300 with the directional antenna may be installed at the entrance or exit of a parking area, wherein the directional antenna ensures the broadcasting of the locating device only reach the area in front of the parking entrance or exit.

Figure 5:
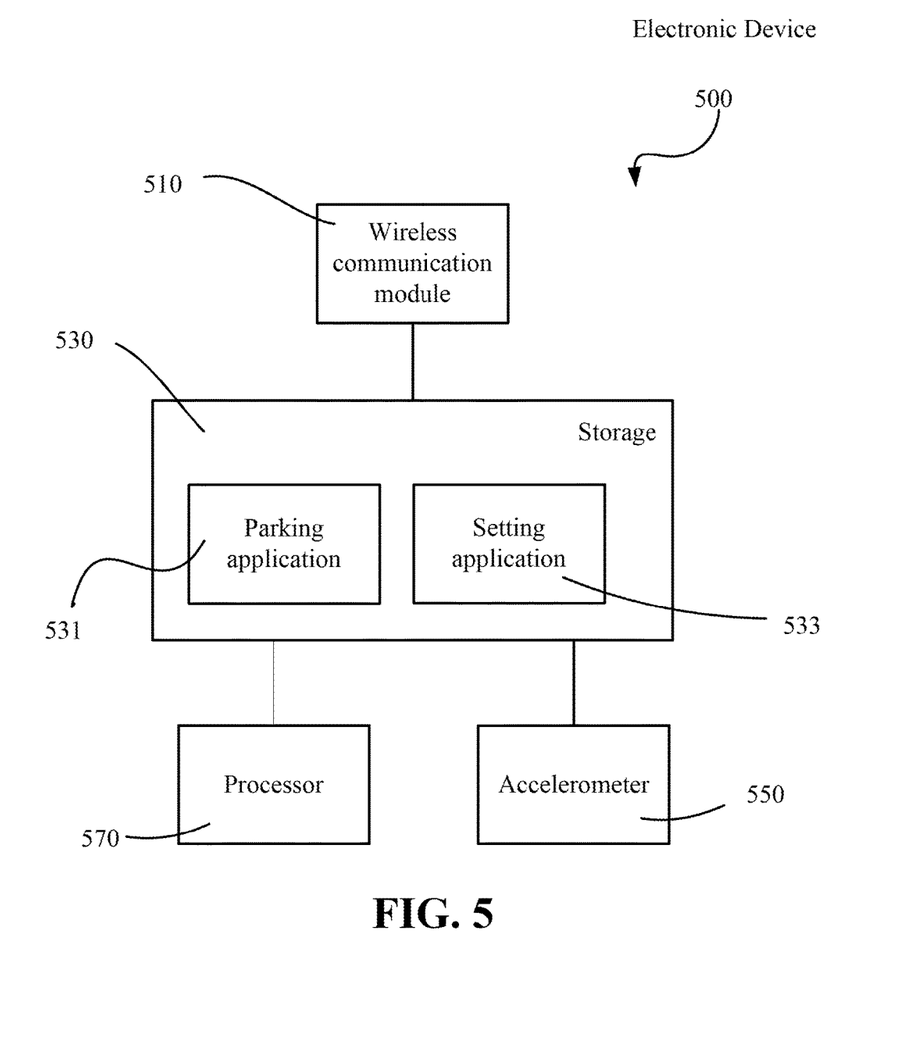
FIG. 5 is a schematic illustration of the electronic device according to one embodiment of the present invention.

FIG. 5 schematically illustrates the electronic device 500 comprising a wireless communication module 510, a storage 530, an accelerometer 550 and a processor 570 according to one embodiment of the present invention, wherein the storage 530 comprises a parking application 531 and a setting application 533. The storage 530 may be coupled to the wireless communication module 510, the accelerometer 550 and the processor 570, wherein the processor 570 may operate the parking application 531 and/or the setting application 533.

Referring to FIG. 5, in one embodiment of the present invention, the wireless communication module 510 may receive a location information from a broadcasting of a locating device 300 into the parking application 531 in the storage, and the parking application may determine a location of the electronic device 500 according to the location information and the RSSI of the broadcasting. The location of the electronic device 500 may be sent to the locating device 300 with an identification information.

In one embodiment of the present invention, the location of the electronic device 500 may be repeatedly determined as the device moving between a plurality of locating devices 300 or simply remains stationary around at least one locating device 300, and thus the repeatedly determined location of the electronic device 500 may be sent to a management server for tracking and other management purpose, such as navigation to a vacant parking space or controlling the illumination of light in proximity of the electronic device 500, etc.

In another embodiment of the present invention, the location of the electronic device 500 may be calibrated with assistance of the accelerometer 550 and/or a gyroscope and/or a compass according to the last determination of the location of the electronic device 500 whether the electronic device 500 is within the broadcasting range of at least one locating device 300 or not.

In one embodiment of the present invention, the accelerometer 550 may send the acceleration information of the electronic device 500 to the management server 100, wherein the management server 100 may determine the parking state of a vehicle with the electronic device 500. As the parking state of the vehicle may be determined, the management server 100 may determine which vehicle is parked with location information does not match with a location information of parking spaces and thus illegal parking happens. In the case of illegal parking, the management server 100 may raise the parking fee rate of the illegally parked vehicle as penalty or notify the parking service provider to lock the vehicle.

In one embodiment of the present invention, the electronic device 500 may further comprise a display unit (not shown), which may show the navigation route provided by the management server 100. Furthermore, the electronic device 500 may further comprise a speaker (not shown), wherein the speaker may provide voice instruction according to the navigation route provided by the management server 100.

In one embodiment of the present invention, the setting application 533 may allow the user of the electronic device 500 to configure location information of a locating device 300, wherein the configuration may comprise entering the location information into the electronic device 500 and transmitting the location information via the wireless communication module 510 to the locating device 300. The location information may be obtained by the user as a definite coordinate or relative coordinate from a third party GIS (geographical information system) or any other traditional measurement together with a reference landmark.

Figure 6:
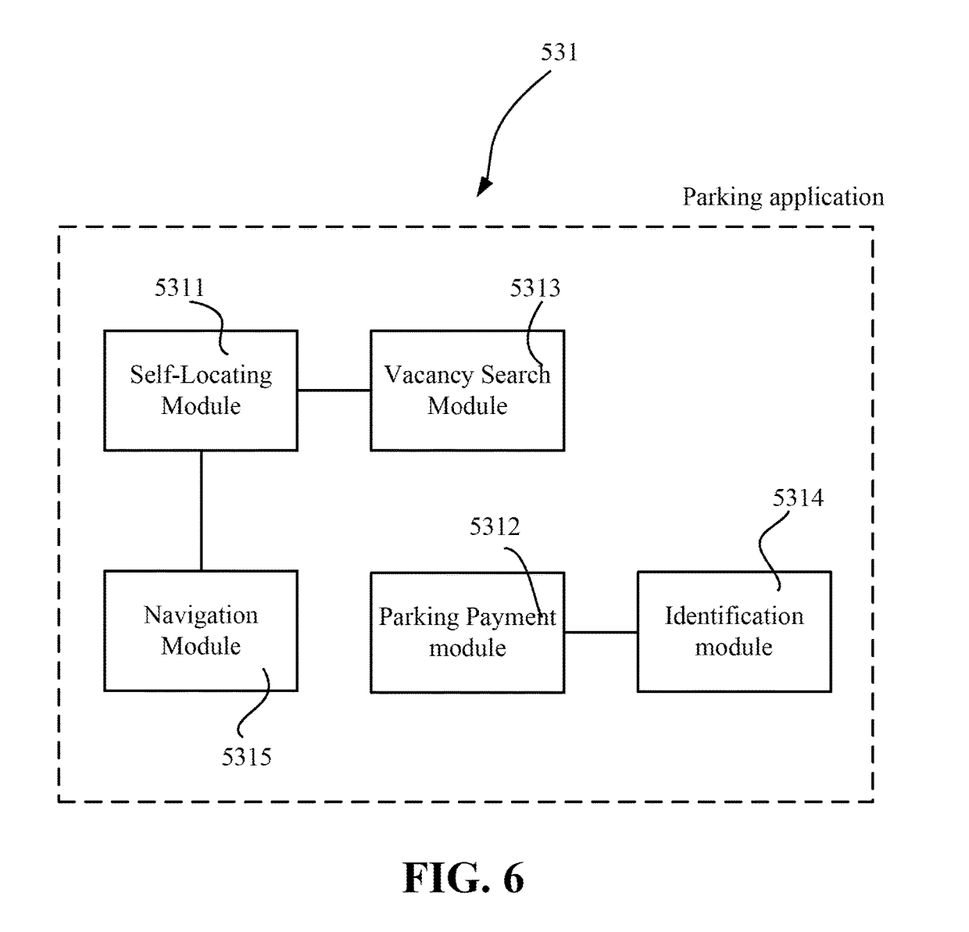
FIG. 6 is a schematic illustration of the parking application according to one embodiment of the present invention.

FIG. 6 schematically illustrates the parking application 531 of the electronic device 500 comprising a self-locating module 5311, a vacancy search module 5313, a navigation module 5315, a parking payment module 5312 and an identification module 5314 according to one embodiment of the present invention, wherein the self-locating module 5311 may be coupled to the vacancy search module 5313 and the navigation module 5315, and the parking payment module 5312 may be coupled to the identification module 5314.

Referring to FIG. 6, in one embodiment of the present invention, the self-locating module 5311 may determine a location of the electronic device 500 according to the location information broadcasted from at least one locating device 300 and the RSSI of the broadcasting, and the electronic device 500 may broadcast the determined location to at least one locating device 300 within the broadcasting range of the electronic device 500. The vacancy search module 5313 may request location of vacant parking space from a management server 100. The navigation module 5315 may obtain a map with location of the electronic device 500 and vacant parking space marked on the map and/or including at least one navigation route from a management server, and the navigation module 5315 may provide navigation to the user of electronic device 500.

In one embodiment of the present invention, the parking payment module 5312 may request a parking fee information from a management server 100 as the identification module may provide an identification information to the management server 100. The identification information may be a device ID, a user ID or a vehicle plate number.

In another embodiment of the present invention, the parking payment module 5312 may be configured to pay for the parking fee after obtaining the parking fee information from the management server 100 by comprising account information or a credit card information of the user of the electronic device 500. In this case, the parking payment module 5312 may request an electronic receipt of the payment made from the management server 100.

In another embodiment of the present invention, the identification module 5314 may provide identification information to a management server 100 for entrance permit.

In another embodiment of the present invention, the identification module 5314 may provide identification information together with a payment receipt to a management server 100 for exit permit.

Figure 7:
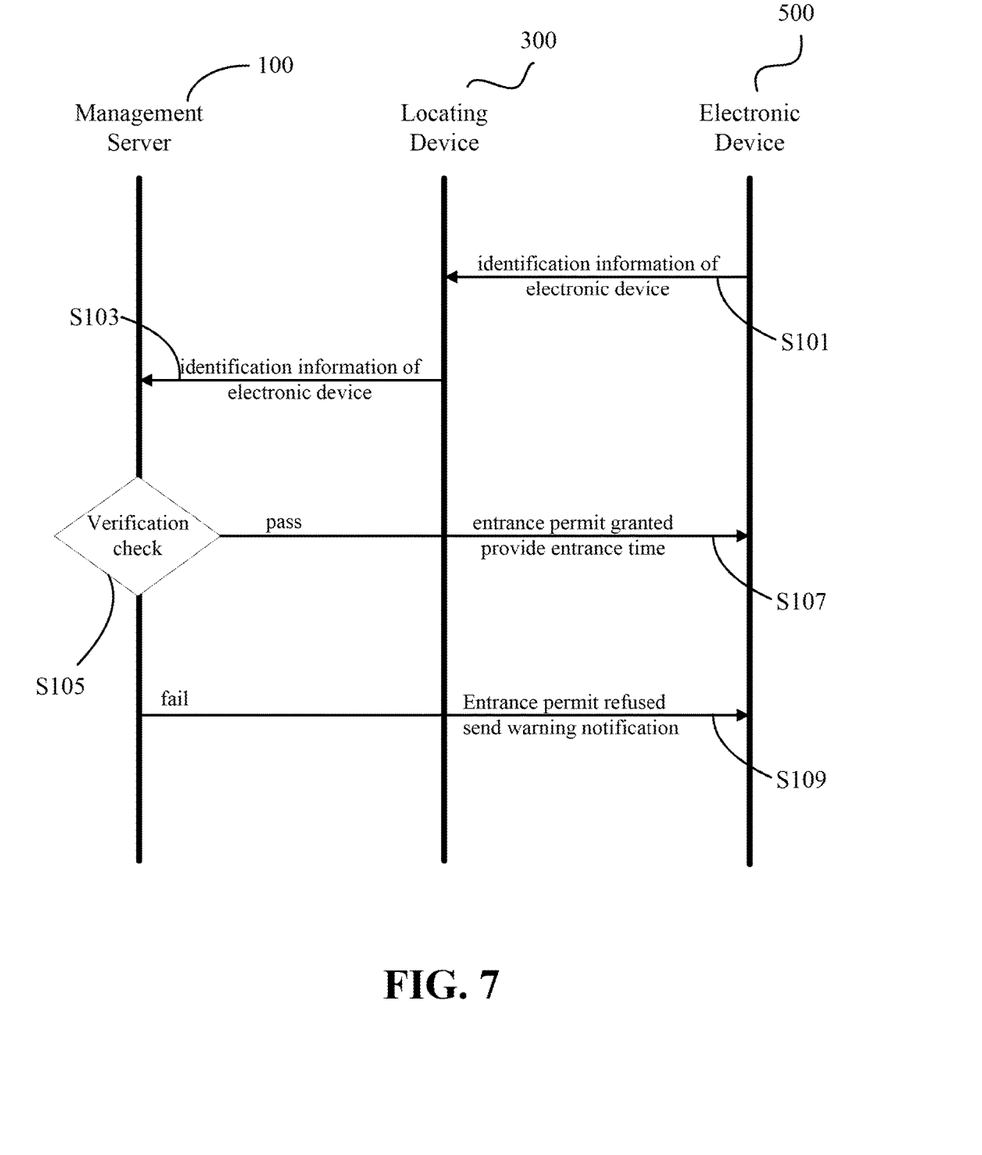
FIG. 7 is a schematic illustration of a method of operating the locating system at a parking area entrance when a user/vehicle is trying to enter the parking area according to one embodiment of the present invention.

FIG. 7 schematically illustrates a method of operating the locating system 10 at a parking area entrance when a user/vehicle is trying to enter the parking area according to one embodiment of the present invention.

Referring to FIG. 7, an electronic device 500 may be provided as a mobile device, OBU, or vehicle console, and a locating device 300 which may be installed at the entrance of the parking area. In step S101, the electronic device 500 may send an identification information to the locating device 300. In step S103, the locating device 300 may pass the identification information to a management server 100 for the parking area. In step S105, the management server 100 may perform a verification check. In step S107, the management server 100 may send a management instruction to the gate if the user/vehicle passes the verification check, and thus the gate opens and grants the entry of the user/vehicle, while at the same time the management server 100 may provide an entrance time to the electronic device 500. In step S109, the management server 100 may refuse the entry of the user/vehicle if the user/vehicle fails the verification check, and thus the management server 100 may send a warning notification to the user/vehicle.

In one embodiment of the present invention, the communication between the management server 100 and the electronic device 500 may be through the locating device 300.

In another embodiment of the present invention, the communication between the management server 100 and the electronic device 500 may be without the locating device 300.

In one embodiment of the present invention, the management server 100 may provide a white list or a black list for verification check, wherein the white list comprise a list of identification information which may be permitted to enter the parking area, and the black list comprise a list of identification information which may refused to enter the parking area.

In one embodiment of the present invention, the identification information may be a device ID of the electronic device 500, a user ID of the user, and/or a vehicle plate number of the vehicle.

In another embodiment of the present invention, in the case of mal-functioning electronic device 500 or locating device 300, the verification check could be done by providing a camera at the entrance of the parking area that may take an image of the vehicle and send it to the management server 100. Therefore, the management server 100 may identify the vehicle plate number from the image and use it as an identification information.

Figure 8:
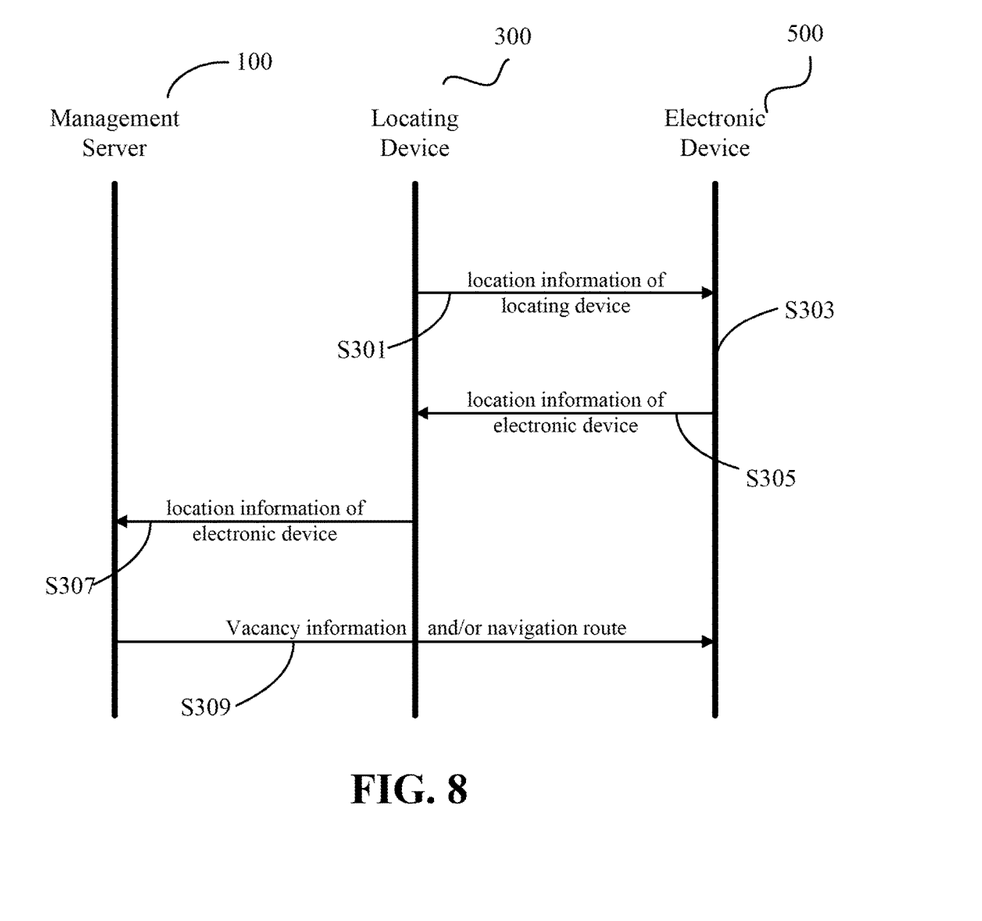
FIG. 8 is a schematic illustration of a method of operating the locating system to assist a user/vehicle parking in a parking area according to one embodiment of the present invention.

FIG. 8 schematically illustrates a method of operating the locating system to assist a user/vehicle parking in a parking area.

Referring to FIG. 8, an electronic device 500 may be provided as a mobile device, OBU, or vehicle console, and a plurality of locating devices 300 each with a specific location information of its own within the parking area. In step 301, the plurality of locating devices 300 may broadcast the location information. In step 303, the electronic device 500 may receive at least one location information from at least one locating device 300 within the parking area and determine a location information of the electronic device 500 based on the received location information and the RSSI of the broadcasting. In step 305, the electronic device 500 broadcasts the determined location information to at least one locating device 300 within its broadcasting range. In step 307, the at least one locating device 300 which received the determined location information of the electronic device 500 send the determined location information to a management server 100 of the parking area. In step 309, the management server 100 provides a vacancy information and/or at least one navigation route to the electronic device 500. Therefore, the user/vehicle may follow the navigation route to a vacant parking space.

In one embodiment of the present invention, the communication between the management server 100 and the electronic device 500 may be through the locating device 300.

In another embodiment of the present invention, the communication between the management server 100 and the electronic device 500 may be without the locating device 300.

In one embodiment of the present invention, a navigation route may be provided after the user of the electronic device 500 chooses a vacant parking space among the vacancy information.

In another embodiment of the present invention, the management server 100 may assign a specific vacant parking space with a corresponding navigation route in step S309 to avoid traffic jamming or more than one user/vehicle to park the same vacant parking space.

In one embodiment of the present invention, the management server 100 may be accessed by the electronic device 500 through internet, wherein the user of the electronic device 500 may reserve a parking space before entering the parking area, and thus the management server 100 may provide a navigation route to the reserved parking space in step 309.

Figure 9:
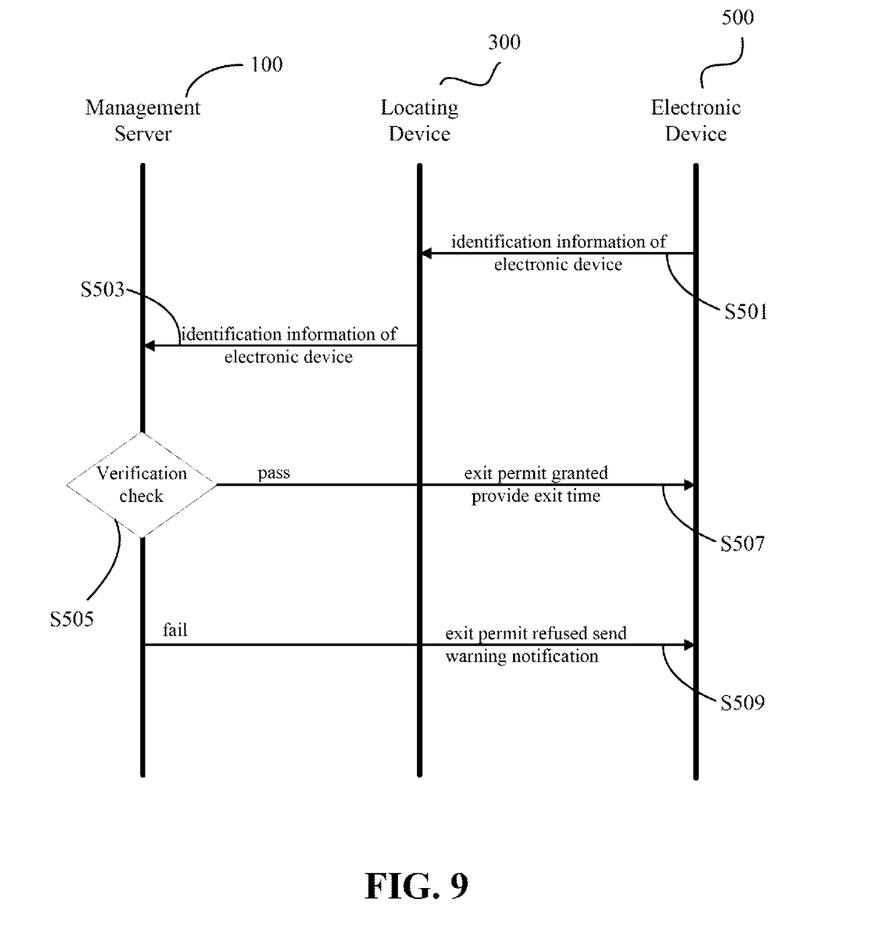
FIG. 9 is a schematic illustration of a method of operating the locating system at a parking area entrance when a user/vehicle is trying to exit the parking area according to one embodiment of the present invention.

FIG. 9 schematically illustrates a method of operating the locating system 10 at a parking area entrance when a user/vehicle is trying to exit the parking area according to one embodiment of the present invention.

Referring to FIG. 9, an electronic device 500 may be provided as a mobile device, OBU, or vehicle console, and a locating device 300 which may be installed at the exit of the parking area. In step S501, the electronic device 500 may send an identification information to the locating device 300. In step S503, the locating device 300 may pass the identification information to a management server 100 for the parking area. In step S505, the management server 100 may perform a verification check. In step S507, the management server 100 may send a management instruction to the gate if the user/vehicle passes the verification check, and thus the gate opens and grants the exit of the user/vehicle, while at the same time the management server 100 may provide an exit time to the electronic device 500. In step S509, the management server 100 may refuse the exit of the user/vehicle if the user/vehicle fails the verification check, and thus the management server 100 may send a warning notification to the user/vehicle.

In one embodiment of the present invention, the communication between the management server 100 and the electronic device 500 may be through the locating device 300.

In another embodiment of the present invention, the communication between the management server 100 and the electronic device 500 may be without the locating device 300.

In one embodiment of the present invention, the verification check performed by the management server 100 may be checking the payment of the parking fee according to the identification information, wherein only user who made the payment of parking fee may pass the verification check.

In another embodiment of the present invention, the verification check performed by the management server 100 may comprises matching the identification information which may be a user ID provided by the user to a vehicle plate number or a device ID stored in the user database of the management server 100, wherein only the matched user may pass the verification check to avoid vehicle stealing.

In one embodiment of the present invention, the identification information may be a device ID of the electronic device 500, a user ID of the user, and/or a vehicle plate number of the vehicle, wherein the device ID may be a BTID or any other wireless communication module ID, and the user ID may be a real-world ID number.

In another embodiment of the present invention, in the case of mal-functioning electronic device 500 or locating device 300, the verification check could be done by providing a camera at the entrance of the parking area that may take an image of the vehicle and send it to the management server 100. Therefore, the management server 100 may identify the vehicle plate number from the image and use it as an identification information.

Previous descriptions are only embodiments of the present invention and are not intended to limit the scope of the present invention. Many variations and modifications according to the claims and specification of the disclosure are still within the scope of the claimed invention. In addition, each of the embodiments and claims does not have to achieve all the advantages or characteristics disclosed. Moreover, the abstract and the title only serve to facilitate searching patent documents and are not intended in any way to limit the scope of the claimed invention.

What is claimed is:

1. A system for parking management, comprising:
at least one locating device configured to broadcast a location information to an electronic device and to receive a determined location which is broadcasted by the electronic device; and
a management server configured to receive the determined location from the at least one locating device,
wherein the management server is configured to provide a vacancy information to the electronic device according to the received determined location, and
wherein the determined location is determined by the electronic device according to the location information broadcasted by the at least one locating device,
wherein the at least one locating device further comprises a light unit and the management server is configured to control the light unit by sending a management instruction to the at least one locating device.

2. The system for parking management according to claim 1, wherein the vacancy information is provided to the electronic device by sending a map.

3. The system for parking management according to claim 2, wherein the map is provided to the electronic device with a navigation route marked on the map.

4. The system for parking management according to claim 1, wherein the management server comprises a verification module to perform a verification check to the electronic device.

5. The system for parking management according to claim 4, wherein the electronic device is configured to respond to the verification check by sending an identification information to the management server.

6. The system for parking management according to claim 1, wherein the at least one locating device comprises a directional antenna.

7. The system for parking management according to claim 1, wherein the vacancy information may be determined by comparing location information of vehicle with location information of parking spaces.

8. The system for parking management according to claim 1, wherein the at least one locating device is configured to receive a signal from a round embedded device, and the vacancy information is determined based on receiving status of the signal.

9. A method for parking management, comprising:
determining, by an electronic device, a determined location according to a location information broadcasted by at least one locating device;
receiving, by a management server, the determined location from an electronic device via at least one locating device;
sending, by the management server, a map marked with the determined location, vacancy information and navigation route to the electronic device; and
sending, by the management server, a management instruction to control a light unit of the at least one locating device according to the determined location;
wherein the step receiving a determined location further comprising receiving an identification information, and the management server is configured to perform a verification check according to the identification information, and is configured to respond to the electronic device based on the verification check.

10. The method for parking management according to claim 9, wherein the locating device comprises a directional antenna.

11. The method for parking management according to claim 9, wherein the step receiving a determined location further comprising receiving an identification information, and the management server is configured to perform a verification check according to the identification information, and is configured to respond to the electronic device based on the verification check.

12. The method for parking management according to claim 11, wherein the identification information is a user ID or a device ID or a vehicle plate number.

13. The method for parking management according to claim 11, wherein the verification check comprises: matching, by the management server, the identification information from the electronic device to an identification information in the management server.

14. A locating device for parking management, comprising:
a directional antenna coupled to the wireless transceiver;
a wireless transceiver configured to use the directional antenna to broadcast a location information to an electronic device and to use the directional antenna to receive a determined location which is broadcasted by the electronic device;
a control unit coupled to the wireless transceiver; and
a light unit coupled to the control unit and configured to provide illumination, wherein the electronic device determines the determined location according to the location information,
wherein the illumination of the light unit is controlled by the control unit when the control unit receives a management instruction from a management server via the wireless transceiver.

15. The locating device for parking management according to claim 14, wherein the light unit is controlled by the control unit to change illumination brightness and/or color.

16. The locating device for parking management according to claim 14, wherein the electronic device determines the determined location according to the location information and a RSSI of the location information broadcasted by the wireless transceiver.

17. A method for vehicle parking, comprising:
receiving, by an electronic device, a location information broadcasted by a locating device; and
determining, by the electronic device, a determined location; and
sending, by the electronic device, the determined location to a management server; and
requesting, by the electronic device, a vacancy information from the management server;
receiving, by the electronic device, a vacancy information according to the determined location from the management server; and
sending, by the management server, a management instruction to control a light unit of the locating device according to the determined location.

18. The method for parking according to claim 17, wherein the vacancy information is a map marked with vacant parking spaces.

19. The method for parking according to claim 17, further comprising steps of: receiving, by the electronic device, a map with a navigation route from the management server according to the determined location and the vacancy information.

20. The method for parking according to claim 17, wherein the locating device comprises a directional antenna.

* * * * *